United States Patent [19]

Schaeffer

[11] 4,065,530

[45] Dec. 27, 1977

[54] METHOD FOR MOLDING PRODUCTS FROM POLYMERIC MATERIAL

[75] Inventor: Paul R. Schaeffer, Paoli, Pa.

[73] Assignee: The Alan I W Frank Corporation, Exton, Pa.

[21] Appl. No.: 686,841

[22] Filed: May 17, 1976

[51] Int. Cl.² .............................................. B29D 27/00
[52] U.S. Cl. ........................................ 264/41; 264/51; 264/126; 264/DIG. 65
[58] Field of Search ............. 264/53, 51, 41, DIG. 10, 264/DIG. 9, 45.4, 126, DIG. 65

[56] References Cited

U.S. PATENT DOCUMENTS

| | | | |
|---|---|---|---|
| 2,066,988 | 1/1937 | Lee | 264/124 X |
| 2,066,993 | 1/1937 | McCombs | 264/124 X |
| 2,250,697 | 7/1941 | Bassett | 264/124 |
| 2,954,589 | 10/1960 | Brown | 264/51 X |
| 3,170,010 | 2/1965 | Schultz et al. | 264/51 |
| 3,236,927 | 2/1966 | Thompson | 264/51 |
| 3,259,677 | 7/1966 | Zwick | 264/126 |
| 3,855,377 | 12/1974 | Uebelhart et al. | 264/DIG. 65 |

*Primary Examiner*—Philip Anderson
*Attorney, Agent, or Firm*—Reed, Smith, Shaw & McClay

[57] ABSTRACT

Apparatus for molding products from polymeric material comprising cooperating mold elements forming a mold cavity for receiving polymeric material to be molded, means for introducing steam into thermoconductive relationship with the respective mold elements and separate valved conduits through which the steam in thermoconductive relationship with the respective mold elements is discharged. Also a method of molding products from polymeric material comprising introducing polymeric material into a mold cavity formed by cooperating mold elements, causing steam to flow in thermoconductive relationship with the respective mold elements and separately controlling the duration of such steam flow in thermoconductive relationship with the respective mold elements.

4 Claims, 1 Drawing Figure

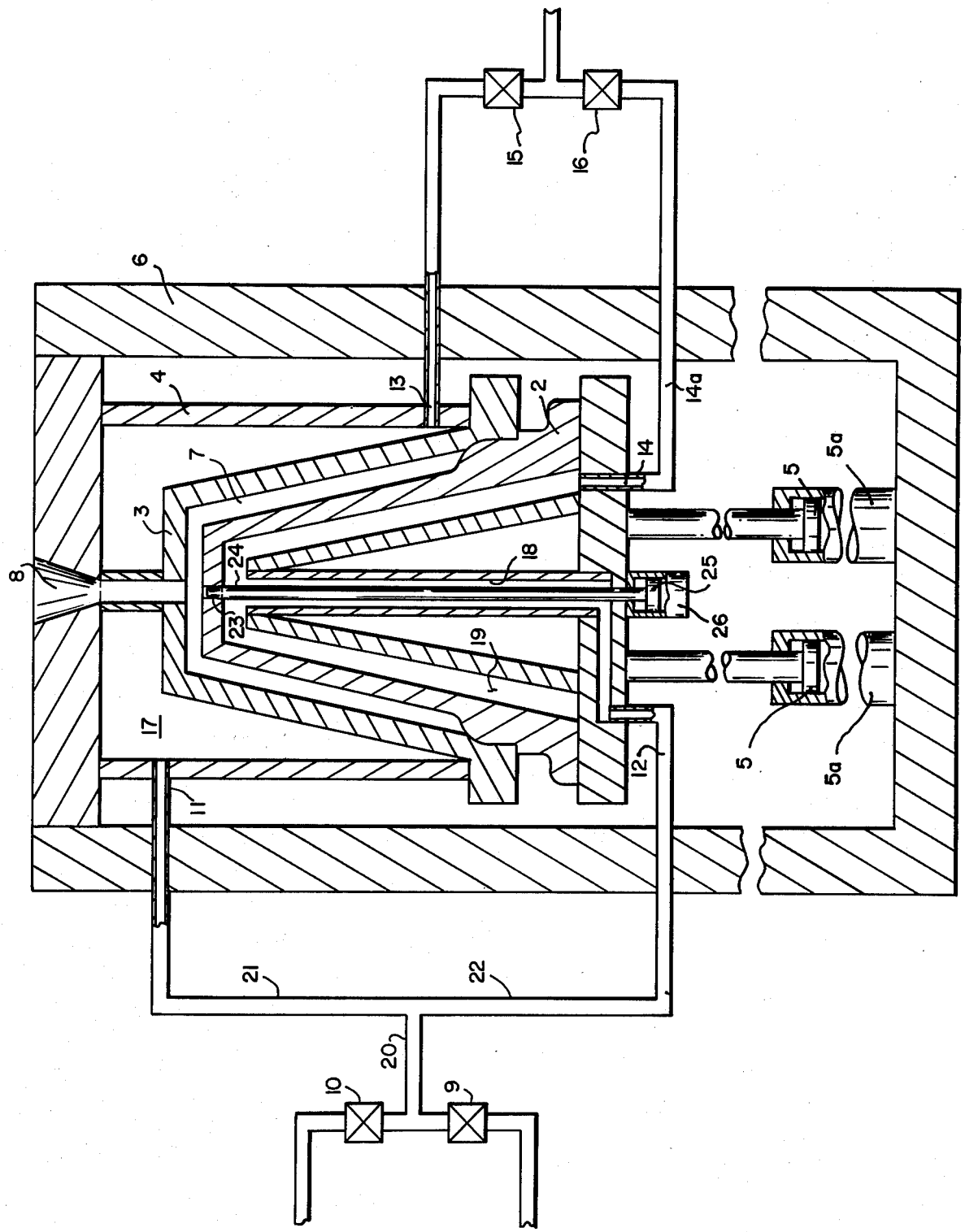

METHOD FOR MOLDING PRODUCTS FROM POLYMERIC MATERIAL

This invention relates to an improved method for molding products from polymeric material. More particularly, it provides for a considerable reduction in energy in the form of steam required to mold polymeric material such, for example, as foamed polystyrene in the form of beads of spheres which is placed in a mold of metal or other thermoconductive material to mold products of various kinds such, for example, as cup-like products including drinking cups.

A typical cycle in the molding of foamed polystyrene beads into cups in a metal mold consists of the following steps: 1) mold closing, 2) mold filling, 3) mold heating, 4) steam injection, 5) cooling and 6) mold opening. Conventional molding machines operate with only one outlet valve controlling the discharge of steam and condensate from both the male and female mold elements, which mold elements when closed form a mold cavity which determines the shape of the molded article. One of the mold elements receives steam to be injected into the mold cavity, which steam is delivered into the mold cavity through an injection device in that mold element. Usually the male mold element is the one through which the injection steam is injected into the mold cavity but in certain cases the female mold element may be used for that purpose.

Frequently in the present art steam is passed through both mold elements during steps 1, 2 and 3 of the molding cycle and during this time the discharge valve is in the open position. During step 4 it is closed preventing any further steam discharge; as is well known to those familiar with the process discharge of steam from the mold elements is desirably stopped during steam injection into the mold cavity. While this is a common sequence of steam flow in relation to the various steps mentioned above, modifications of this sequence are sometimes used to accommodate changes in mold design such as size or shape and materials.

In order to reduce steam consumption attempts have been made to close the discharge valve earlier in the cycle or to throttle the flow by partially closing the valve during steps 2 and 3. This has only limited success because of the tendency to impart porosity to the molded product resulting in poor resistance to leakage.

I have found that steam flow to the female mold element can be of shorter duration than steam flow to the male mold element without imparting porosity to the molded product. Furthermore, when steam flow to the female mold element is discontinued early, more steam is diverted to the male mold element resulting in faster heat up and condensate removal in the male mold element. Consequently the steam flow to the male mold element can be of shorter duration also.

Therefore, by using two valves, one to control the discharge of steam and condensate in thermoconductive relationship with the male mold element and one to receive the discharge of steam and condensate in thermoconductive relationship with the female mold element, both valves can be closed earlier. Preferably the valve receiving the discharge of steam and condensate in thermoconductive relationship with the mold element which receives and supplies steam to the injection device is closed later than the other valve but no later than the beginning of steam injection into the mold cavity. The valve closing earlier may be closed at least as early as the start of step 2.

Other details, objects and advantages of the invention will become apparent as the following description of a present preferred embodiment of the invention and a present preferred method of practicing the same proceeds.

In the accompanying drawing I have shown a present preferred embodiment of the invention and have illustrated a present preferred method of practicing the same. The FIGURE is a diagrammatic cross-sectional view of apparatus for molding products from polymeric material embodying my invention.

As shown in the drawing the female mold element 3 receives the male mold element 2 by action of pistons 5 operable in cylinders 5a. Female mold element 3 is mounted to frame 6 by means of support 4. The mold cavity 7 formed by male mold element 2 and female mold element 3 is filled with foamed polystyrene beads introduced through fill hole 8 by suitable means not shown which are well known to those skilled in the art. Alternately steam and coolant such as water are delivered to the mold through valves 9 and 10 and each flows at 11 into the space or channel 17 in thermoconductive relationship with the female mold element 3 and through the conduit 12 and up within the tube 18 into the space or channel 19 in thermoconductive relationship with the male mold element 2 as well known to those skilled in the art. The steam and condensate leave the space or channel 17 at 13 and pass out through the valve 15 and leave the space or channel 19 at 14 and pass out through the conduit 14a and the valve 16. The common conduit 20 and the branches 21 and 22 constitute a manifold so that when, for example, the valve 15 is closed while the valve 16 is still open additional steam is diverted through the branch 22 and conduit 12 into space or channel 19.

Steam injection into the mold cavity 7 is accomplished at the appropriate time by downward retraction of piston 25 in air cylinder 26 which retracts connecting rod 24 and opens valve 23 so that steam in space 19 enters the mold cavity.

The conduits 12 and 14a are flexible to provide for movement of the male mold element into and out of cooperative relationship with the female mold element.

While I have shown and described a present preferred embodiment of the invention and have described a present preferred method of practicing the same, it is to be distinctly understood that the invention is not limited thereto but may be otherwise variously embodied and practiced within the scope of the following claims.

I claim:

1. In a method for molding products in a mold cavity formed by a male and female mold element which method includes the steps of closing the mold elements to form the cavity, filling said cavity with polymeric beads, heating said mold elements and injecting steam into the cavity through the male mold element, the improvement in said method comprising:
   a. introducing steam into spaces or channels in said mold elements during closing of said elements and permitting said steam to flow therethrough and heat said elements;
   b. terminating the discharge of steam from the female element while commencing the filling of the mold cavity with said polymeric beads;
   c. continuing the flow of steam through said male element and terminating the discharge of steam from the male element not later than the injection of steam into the mold cavity; and d. terminating the flow of steam to both of said elements after said injection of steam.

2. The improvement set forth in claim 1 including the steps of diverting at least a portion of steam from the female mold to the male mold after terminating the discharge of steam from said female mold.

3. In a method for molding products in a mold cavity formed by a male and female mold element which method includes the steps of closing the mold elements to form the cavity, filling said cavity wth polymeric beads, heating said mold elements and injecting steam into the cavity through the female mold element, the improvement in said method comprising:

a. introducing steam into spaces or channels in said mold elements during closing of said elements and permitting said steam to flow therethrough and heat said elements;

b. terminating the discharge of steam from the male element while commencing the filling of the mold cavity with said polymeric beads;

c. continuing the flow of steam through said female element and terminating the discharge of steam from the female element not later than the injection of steam into the mold cavity; and d. terminating the flow of steam to both of said elements after said injection of steam.

4. The improvement set forth in claim 3 including the step of diverting at least a portion of the steam from the male mold to the female mold after terminating the discharge of steam from said male mold.

* * * * *